United States Patent
Kato

(10) Patent No.: US 7,642,448 B2
(45) Date of Patent: Jan. 5, 2010

(54) OPTICAL TRANSDUCER SYSTEM FOR MONITORING MOVABLE PARTS, OPTICAL MODULATOR AND MUSICAL INSTRUMENT USING THE SAME

(75) Inventor: Tadaharu Kato, Shizuoka-ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 30 days.

(21) Appl. No.: 11/762,271

(22) Filed: Jun. 13, 2007

(65) Prior Publication Data
US 2008/0011151 A1    Jan. 17, 2008

(30) Foreign Application Priority Data
Jul. 14, 2006    (JP)    ............... 2006-194069

(51) Int. Cl.
*G10H 3/06*    (2006.01)
(52) U.S. Cl. ............... 84/724; 84/720; 84/723; 84/745
(58) Field of Classification Search .............. None
See application file for complete search history.

(56) References Cited

U.S. PATENT DOCUMENTS

| | | | | |
|---|---|---|---|---|
| 2,941,434 A | * | 6/1960 | Clark, Jr. ............. | 84/639 |
| 2,946,253 A | * | 7/1960 | Clark, Jr. ............. | 84/639 |
| 6,713,751 B2 | * | 3/2004 | Muramatsu et al. .......... | 250/221 |
| 6,815,603 B2 | * | 11/2004 | Kato et al. ............. | 84/744 |
| 7,132,643 B2 | | 11/2006 | Kato | |
| 2002/0194986 A1 | * | 12/2002 | Kato et al. ............. | 84/744 |
| 2003/0025071 A1 | | 2/2003 | Kato et al. | |

FOREIGN PATENT DOCUMENTS

| | | |
|---|---|---|
| JP | 2001-228862 | 8/2001 |
| JP | 2003-44051 | 2/2003 |

* cited by examiner

*Primary Examiner*—Marlon T Fletcher
(74) *Attorney, Agent, or Firm*—Harness, Dickey & Pierce, PLC

(57) ABSTRACT

An optical modulator is hung from a key moved on a key trajectory so as to be moved together with the key, and a light beam, which is stationary with respect to a key bed, is radiated through the optical modulator; a large number of miniature refractors are formed on the light output surface of the optical modulator, and the density of miniature refractors per unit area is varied in a direction in which the optical modulator is moved together with the key so that the current key position is converted to the amount of light passing through the optical modulator; since the miniature refractors and other portions of optical modulator have a unitary structure, a molding process is used for the optical modulator, and the molding process make the production cost low.

7 Claims, 8 Drawing Sheets

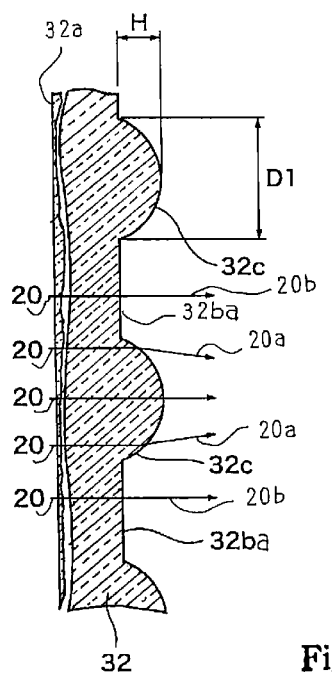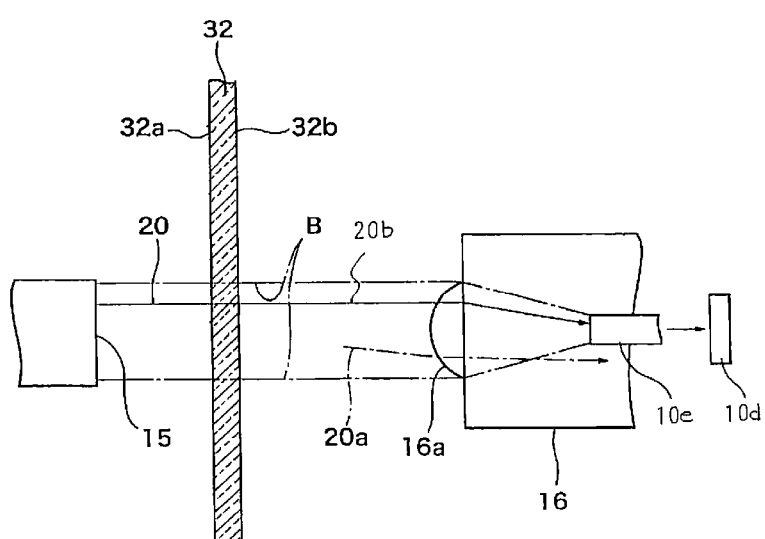
Fig. 5 A
Fig. 5 B

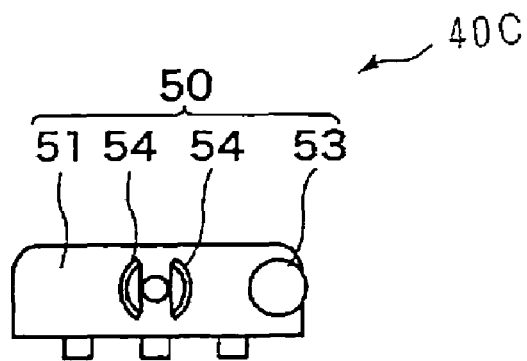
Fig. 11
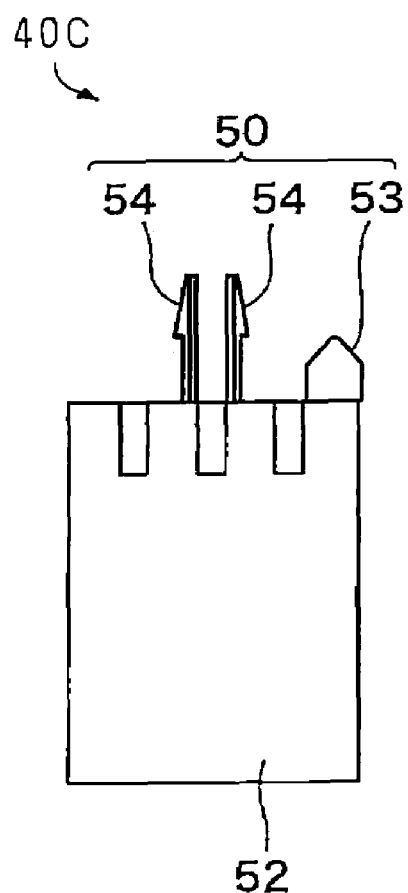 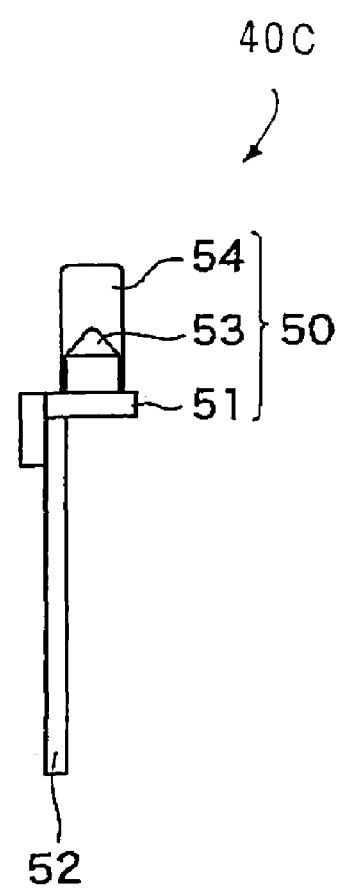
Fig. 12  Fig. 13

OPTICAL TRANSDUCER SYSTEM FOR MONITORING MOVABLE PARTS, OPTICAL MODULATOR AND MUSICAL INSTRUMENT USING THE SAME

FIELD OF THE INVENTION

This invention relates to an optical transducer system and, more particularly, to an optical transducer system available for a musical instrument having movable parts to be monitored therewith and an optical modulator incorporated in the optical transducer system.

DESCRIPTION OF THE RELATED ART

While a player is performing a music tune on an acoustic musical instrument such as, for example, a piano, the player selectively depresses and releases the keys, and the keys make the action units drive the hammers for rotation toward the strings, and the hammers give rise to the vibrations of strings at the collision with the strings. Thus, the acoustic tones are produced only through the actuation of mechanical linkage in the acoustic musical instrument. However, an electric system and/or an electronic system participates in generation of tones through electronic musical instruments and hybrid musical instruments. Movements of certain mechanical component parts are converted to electric signals, and the pieces of performance data, which express the movements of the certain mechanical component parts, are analyzed and processed so as to produce an audio signal expressing the tones to be produced. The audio signal is converted to the tones through a sound system. Thus, a suitable transducer system is an indispensable in the electronic musical instruments and hybrid musical instruments.

A mute piano is a typical example of the hybrid musical instrument. The mute piano includes an acoustic piano, a hammer stopper and an electronic tone generating system. While the hammer stopper is staying outside the trajectories of the hammers, the hammer stopper does not interfere with the hammers, and a player fingers on the acoustic piano for producing the acoustic piano tones along a music passage. When the player wishes to perform a music tune without the acoustic piano tones, the player moves the hammer stopper on the trajectories of hammers. Although the player gives rise to the rotation of hammers through the fingering on the acoustic piano, the hammers rebound on the hammer stopper before striking the strings, and any acoustic piano tone is not produced in the acoustic piano. Instead, the electronic tone generating system produces an audio signal expressing electronic tones specified by the player through the fingering, and the audio signal is converted to the electronic tones through a headphone. Thus, the electronic tone generating system converts the movements of keys and the movements of hammers to the electric signals, and analyzes and processes the pieces of performance data for producing the electronic tones.

An optical position transducer system is employed in the hybrid musical instrument. The optical position transducer system includes light emitting elements, light detecting elements and shutter plates. The light emitting elements and light detecting elements are stationary with respect to the key bed of the acoustic piano, and produce light beams across the trajectories of keys and the trajectories of hammers. The shutter plates are attached to the keys and hammers, and are moved together with the keys and hammers. The shutter plates vary the amount of light received by the light detecting elements depending upon the areas where the light beams pass.

While the keys and hammers are moved on the trajectories, the areas are varied, and make the amount of light incident on the light detecting elements varied depending upon the current key positions on the key trajectories and the current hammer positions on the hammer trajectories. The incident light is converted to photo current so that the amount of photo current expresses the current key positions and current hammer positions.

The shutter plate or an optical modulator is disclosed in Japan Patent Application laid-open No. 2001-228862. The prior art optical modulator disclosed in the Japan Patent Application laid-open is hereinafter referred to as the first prior art optical modulator. The first prior art optical modulator is fabricated on a transparent plate, and a black dot pattern is printed on the transparent plate in such a manner that the dot density is varied in a predetermined direction in which the component part of the musical instrument is moved together with the first prior art optical modulator is moved. The light beam is fallen on the black dot pattern, and the light spot is moved on the first prior art optical modulator in the predetermined direction during the movement of the component part. The light is partially shielded with the black dot pattern, and is partially transmitted through the transparent plate. Since the dot density is varied in the predetermined direction, the amount of light incident on the light detecting element is varied together with the movement of the component part. Thus, the current position of the component part on the trajectory is converted to the amount of photo current.

Another shutter plate or optical modulator is disclosed in Japan Patent Application laid-open No. 2003-44051. The prior art optical modulator disclosed in Japan Patent Application laid-open is hereinafter referred to as the second prior art optical modulator. The second prior art optical modulator is fabricated on a transparent plate, and a black wedge pattern is printed in such a manner that the black area is varied in a predetermined direction in which the component part of the musical instrument is moved together with the second prior art optical modulator is moved. The light beam is fallen on the black wedge pattern, and the light spot is moved on the second prior art optical modulator in the predetermined direction during the movement of the component part. The light is partially shielded with the black wedge pattern, and is partially transmitted through the transparent plate. Since the black area is varied in the predetermined direction, the amount of light incident on the light detecting element is varied together with the movement of the component part. Thus, the current position of the component part on the trajectory is also converted to the amount of photo current.

In the modifications of the first and second prior art optical modulators, the black dot pattern and black wedge pattern are printed on sheets of transparent flexible film, and the sheets of printed patterns are adhered to the transparent plates.

The third prior art optical modulator is made of metal. Through-holes are formed in the photo-shield metal plate in such a manner that the through-holes have the diameter different in a predetermined direction in which the component part of the musical instrument is moved. While the component part is traveling on the trajectory, the light spot is moved on the non-transparent metal plate. The light beam is partially shielded with the photo-shield metal plate, and is partially transmitted through the through-holes. Since the diameter of through-holes is varied in the predetermined direction, the amount of light incident on the light detecting element is varied together with the current position of the component part. Thus, the current position of component part is converted to the amount of light varied depending upon the movement of the component part.

Although the current position of component part is surely converted to the electric signal by means of the prior art optical modulators, a problem is encountered in the first, second and third prior art optical modulators in that the prior art optical modulators make the production cost of the hybrid musical instrument increased.

In detail, the manufacturer firstly prepares the transparent plate for the first prior art shutter. Thereafter, the manufacturer prints the black dot pattern or black wedge pattern on a major surface of the transparent plate.

Otherwise, the manufacturer prints the black dot pattern or black wedge pattern on a sheet of flexible film, and, thereafter, adheres the printed sheet of flexible film onto the major surface of the transparent plate. Thus, the first prior art optical modulator and second prior art optical modulator are fabricated through the prior art process having two steps or three steps.

The prior art fabrication process for the third prior art shutter is more complicated. The manufacture firstly prepares the photo-shield metal plate. Subsequently, the manufacturer forms the through-holes in the photo-shield metal plate by using twisted drills. In order to make the through-holes different in diameter, it is necessary to repeat the drill work with different twisted drills.

Otherwise, the manufacturer overlays a photo-sensitive layer on the photo-shield metal plate, and the pattern of holes is optically transferred from a mask to the photo-sensitive layer for producing a latent image in the photo-sensitive layer. The latent image is developed, and a photo-sensitive mask is prepared on the photo-shield plate. The multiple layered structure of photo-shield plate and photo-sensitive layer is exposed to etchant. Then, the photo-shield metal plate is partially etched away, and the prior art shutter is obtained. The machining process or photo-lithographic process are complicated, and are costly.

All of the prior art optical modulators are fabricated through the complicated processes, and, accordingly, the production cost is high. A lot of optical modulators are required for the musical instrument. This results in the high production cost of the musical instrument.

SUMMARY OF THE INVENTION

It is therefore an important object of the present invention to provide an optical transducer system, which is reduced in production cost.

It is another important object of the present invention to provide an optical modulator, which is used in the optical transducer system.

It is also an important object of the present invention to provide a musical instrument, which is equipped with the optical transducer system.

To accomplish the objects, the present invention proposes to modulate light through refraction.

In accordance with one aspect of the present invention, there is provided an optical transducer system for converting a physical quantity of a moving object to an electric signal, and the optical transducer system comprises a light emitting unit radiating a light beam across a trajectory of the moving object, a light detecting unit stationary with respect to the light emitting unit and receiving modulated light so as to convert the modulated light to the electric signal and an optical modulator relatively moved with respect to the light emitting unit and the light detecting unit due to the movement of the moving object on the trajectory, producing the modulated light from the light beam fallen thereon and having a non-refracting portion transparent to the light beam so as to produce a part of the modulated light and a refracting portion varying the amount of another part of the modulated light through refraction of the light beam depending upon the physical quantity of the moving object on the trajectory.

In accordance with another aspect of the present invention, there is provided an optical modulator relatively moved with respect to a light emitting unit radiating a light beam and a light detecting unit receiving modulated light, and the optical modulator comprises a non-refracting portion transparent to the light beam and producing a part of the modulated light and a refractor varying the amount of another part of the modulated light through refraction of the light beam depending upon the physical quantity of a moving object.

In accordance with yet another aspect of the present invention, there is provided a musical instrument for producing tones comprises plural force propagating paths on which force is selectively exerted for specifying an attribute of tones and having certain component parts, respectively, plural tone generators provided in association with the plural force propagating paths, respectively, and producing the tones at the attribute, an optical transducer system converting a physical quantity of the certain component parts to electric signals and including plural light emitting units radiating light beams across trajectories of the certain component parts, respectively, plural light detecting units stationary with respect to the light emitting units and receiving modulated light so as to convert the modulated light to the electric signals and plural optical modulators relatively moved with respect to the light emitting units and the light detecting units due to the movements of the certain component parts on the trajectories for producing the modulated light from the light beams fallen thereon, respectively, and an information processing system connected to the plural light detecting units and processing pieces of data information expressing said physical quantity of said certain component parts for producing pieces of music data expressing said tones, and each of the optical modulators has a non-refracting portion transparent to the light beam so as to produce a part of the modulated light and a refracting portion varying the amount of another part of the modulated light through refraction of the light beam depending upon the physical quantity of the moving object on the trajectory.

BRIEF DESCRIPTION OF THE DRAWINGS

The features and advantages of the optical transducer system, optical modulator and musical instrument will be more clearly understood from the following description taken in conjunction with the accompanying drawings, in which FIG. 5A is a cross sectional view showing light passing through a miniature refractor, FIG. 5B is a cross sectional view showing the optical modulator between sensor heads, FIG. 11 is a plane view showing still another optical modulator according to the present invention, FIG. 12 is a side view showing the optical modulator, and FIG. 13 is a front view showing the optical modulator.

DESCRIPTION OF THE PREFERRED EMBODIMENTS

Figure 1:
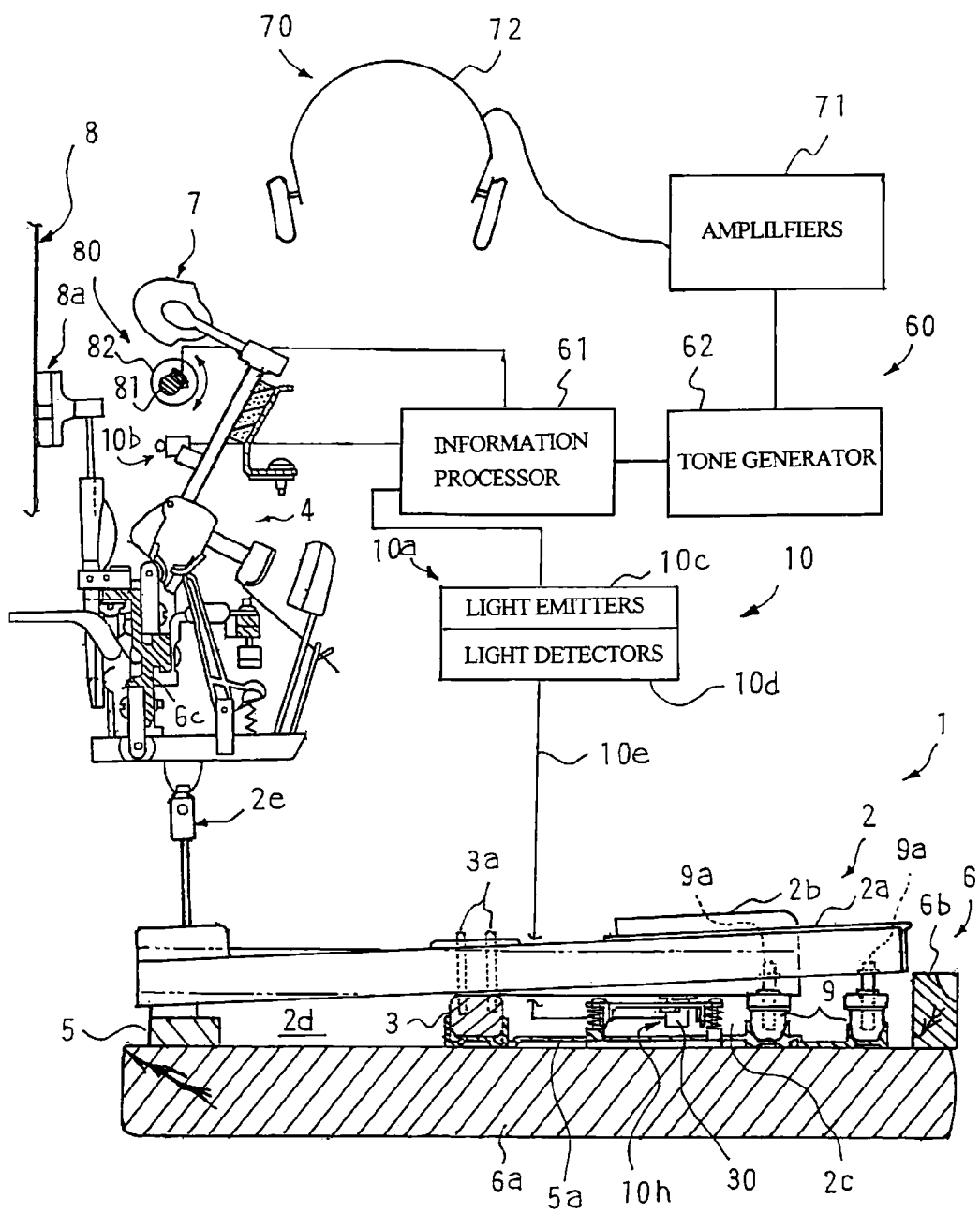
FIG. 1 is a cross sectional side view showing a mute piano according to the present invention.

A musical instrument embodying the present invention largely comprises plural force propagating paths, plural tone generators, an optical transducer system and an information processing system. Force is selectively exerted on the plural force propagating paths for specifying an attribute of tones such as, for example, the pitch of tones. The force is propagated through the force propagating paths to the plural tone generators, and makes the tone generators produce tones at the specified attribute.

The plural force propagating paths have certain component parts, respectively. While the force is propagating through one of the plural force propagating paths to the associated tone generator, the certain component part is activated during the propagation of force. For this reason, the attribute of tones to be produced is presumable through the behavior of certain component parts. In order to monitor the certain component parts, the optical transducer system is provided for the certain component parts.

The optical transducer system is expected to convert a physical quantity of the certain component parts to electric signals, and includes plural light emitting units, plural light detecting units and plural optical modulators. Light beams are radiated from the light emitting units toward the light detecting units across trajectories of the certain component parts, respectively. Although the light detecting units are stationary with respect to the associated light emitting units, the optical modulators are relatively moved with respect to the light emitting units and light detecting units due to the movements of the certain component parts. The light beams are fallen on the optical modulators, and the optical modulators modulate the light beams during the movements of the certain component parts. The modulated light is incident on the light detecting units, and is converted to the electric signal expressing the physical quantity of the certain component parts.

The electric signals are supplied from the light detecting units to the information processing system. As described hereinbefore, the attribute of tones are presumable on the basis of the behavior of certain component parts. The information processing system processes pieces of data information expressing the physical quantity of certain component parts so as to determine the tones to be produced. The information processing system produces pieces of music data expressing the tones to be produced.

There are various ways to use the pieces of music data. The pieces of music data may be supplied to another musical instrument for a remote concert. In case where the musical instrument is equipped with a sound system, the tones are produced on the basis of the pieces of music data by means of the sound system. In case where the musical instrument is equipped with an automatic playing system, the automatic playing system selectively exerts the force on the plural force propagating paths for producing the tones through the tone generators.

The optical modulator is hereinafter detailed. Each of the optical modulators has a non-refracting portions and a refracting portion. The non-refracting portion is transparent to the light beam so as to produce a part of the modulated light. On the other hand, the refracting portion varies the amount of another part of the modulated light through refraction of the light beam depending upon the physical quantity of the moving object on the trajectory. The part of modulated light and another part of modulated light are incident on the associated light detecting unit, and the incident light is converted to the electric signal.

As will be appreciated from the foregoing description, each of the optical modulators has the refracting portion so that the light beam is modulated through the refraction. It is easy for the manufacturer to make the non-refracting portion and refracting portion concurrently produced in the optical modulator. For this reason, the optical modulator is low in production cost, and makes the optical transducer system and musical instrument reduced in production cost.

In the following description, term "front" is indicative of a position closer to a player, who is sitting on a stool for fingering, than a position modified with term "rear". A line drawn between a front position and a corresponding rear position extends in a "longitudinal direction", and a lateral direction crosses the longitudinal direction at right angle. An up-and-down direction is normal to a plane defined by the longitudinal direction and lateral direction.

First Embodiment

Referring first to FIG. 1 of the drawings, a mute piano embodying the present invention largely comprises an acoustic piano 1, an optical position transducer system 10, an information processing system 60, a sound system 70 and a mute system 80. An upright piano serves as the acoustic piano 1. The optical transducer system 10, information processing system 60 and mute system 70 are installed inside the acoustic piano 1. However, the sound system 70 is partially exposed to the environment.

A player fingers on the acoustic piano 1 for music tunes, and the acoustic piano tones or electronic tones are produced through the acoustic piano 1 or sound system 70. The optical transducer system 10, information processing system 60 and sound system 70 participate in the generation of electronic tones as follows.

The optical transducer system 10 is electrically connected to the information processing system 60, which in turn is electrically connected to the sound system 70. The acoustic piano 1 is monitored by the optical transducer system 10, and pieces of action data expressing the fingering on the acoustic piano are supplied from the optical transducer system 10 to the information processing system 60. The information processing system 60 processes the pieces of action data, and determines the electronic tones specified through the fingering. The information processing system 60 produces an audio signal, and supplies the audio signal to the sound system 70. The audio signal is converted to the electric tones through the sound system 70.

The mute system 80 is changed between a free position and a blocking position. While the mute system 80 is staying at the free position, the mute system 80 permits the acoustic piano 1 to produce the acoustic piano tones. However, when the mute system 80 is changed to the blocking position, the mute system 80 prohibits the acoustic piano 1 from producing the acoustic piano tones. The player hears the electronic tones instead of the acoustic piano tones.

Acoustic Piano

The acoustic piano 1 includes a keyboard 2, action units 4, a piano cabinet 6, hammers 7, strings 8 and damper units 9. The piano cabinet 6 has a key bed 6a, and defines an inner space. The keyboard 2 is mounted on the key bed 6a, and is exposed to a player, who is sitting in front of the keyboard 2 for fingering. A key slip 6b extends in the lateral direction along the front end surface of the key bed 6a, and the space under the keyboard 2 is hidden at the back of the key slip 6b. The action units 4, hammers 7, strings 8 and damper units 9 are housed inside the piano cabinet 6, and cooperate with one another for producing the acoustic piano tones.

The keyboard 2 includes white keys 2a, black keys 2b, a balance rail 3, a back rail 5, a key frame 5a and front rails 9. The pitch names are respectively assigned to the keys 2a/2b so that a player specifies the pitch of tones by selectively depressing the white keys 2a and black keys 2b. The front rails 9 extends in the lateral direction at the back of the key slip 6b, and are located below the front end portion of the keyboard 2. The balance rail 3 extends in parallel to the front rails 9, and is spaced from the front rails 9 in the longitudinal direction. The back rail 5 extends in parallel to the balance rail 3, and is spaced from the balance rail 5 in the longitudinal direction. Thus, front pace 2c takes place under the front portions of white and black keys 2a/2b between the front rails 9 and the balance rail 3, and rear space 2d takes place under the rear portions of white and black keys 2a/2b between the balance rail 3 and the back rail 5. The balance rail 3, back rail 5 and front rails 9 are tied with the key frame 5a.

The white keys 2a and black keys 2b extends in parallel to one another in the longitudinal direction, and are supported on the balance rail 3 by means of balance pins 3a. The white keys 2a and black keys 2b independently pitch up and down. Pairs of front pins 9a upwardly project from the front rails 9, and each pair of front pints 9a is provided for one of the white and black keys 2a/2b. A pair of recesses is formed in each of the white and black keys 2a/2b, and receives the pair of front pins 9a. The pairs of front pins 9a guide the white and black keys 2a/2b to the front rails 9, and prevent the white and black keys 2a/2b from deviation from key trajectories in the lateral direction. Capstan buttons 2e are upright on the rear portions of white and black keys 2a/2b.

While any force is not exerted on the upper surface of the white keys 2a and black keys 2b, the white keys 2a and black keys 2b stay at respective rest positions. The force on the front portions makes the white keys 2a and black keys 2b getting closer and closer to the front rails 9. When the white keys 2a and black keys 2b are brought into contact with the front rails 9, the white keys 2a and black keys 2b reach respective end positions.

The action units 4 are arrayed in the lateral direction, and are rotatably supported by a center rail 6c of the piano cabinet 6. The action units 4 are associated with the white and black keys 2a/2b, respectively, and the capstan buttons 2e are held in contact with the associated action units 4. Thus, the white and black keys 2a/2b are linked with the action units 4 through the capstan buttons 2e so that the movements of white and black key 2a/2b give rise to actuation of associated action units 4. The behavior of action units 4 are well known to persons skilled in the art, and no further description is hereinafter incorporated for the sake of simplicity.

The strings 8 are stretched on a sound board (not shown) of the piano cabinet 6, and are opposed to the hammers 7, respectively. The damper units 8a are respectively driven by the actuated action units 4 so as to be spaced from the associated strings 8 and brought into contact with the associated strings 8. While the action units 4 keep the damper units 8a spaced from the strings 8, the strings 8 are vibratory. On the other hand, while the action units 4 is permitting the damper units 8a to be held in contact with the strings 8, the damper units 8a prohibit the strings 8 from vibrations.

The hammers 7 are rotatably supported by the center rail 6c, and are linked with the action units 4, respectively. While a player is depressing a white key 2a or black key 2b, the depressed key 2a/2b actuates the associated action unit 4. The actuated action units 4 make the damper units 8a spaced from the strings 8, and, thereafter, give rise to rotation of the associated hammers 7 toward the associated strings 8. The hammers 7 are brought into collision with the strings 8, and give rise to the vibrations of strings 8. The acoustic piano tones are radiated from the vibrating strings 8.

Optical Transducer System

The optical transducer system 10 includes a key position transducer subsystem 10a and a hammer position transducer sub-system 10b. Since the hammer position transducer sub-system 10b is similar in structure to the key position transducer system 10a, the key position transducer system 10a is hereinafter detailed, and description on the hammer position transducer subsystem 10b is omitted for the sake of simplicity.

The key position transducer sub-system 10a includes light emitters 10c, light detectors 10d, optical fibers 10e, an optical sensor head unit 10h and optical modulators 30. The light emitters 10c are connected through a bundle of the optical fibers 10e to the optical sensor head unit 10h, which in tern is connected through another bundle of optical fibers 10e to the light detectors 10d. The optical sensor head unit 10h is mounted on the key frame 5a, and is accommodated in the front space 2c between the front rails 9 and the balance rail 3. For this reason, the optical sensor head unit 10h is stationary with respect to the key bed 6a. On the other hand, the optical modulators 30 are respectively attached to the lower surfaces 2h of the white and black keys 2a/2b, and are hung from the lower surfaces 2h. For this reason, the optical modulators 30 are movable on predetermined trajectories together with the white and black keys 2a/2b. The predetermined trajectories extend across light beams produced in the optical sensor head unit 10h so that the amount of light of each light beam is varied with associated one of the optical modulators 30 depending upon the current key position of the associated white key 2a or black key 2b.

Figure 2:
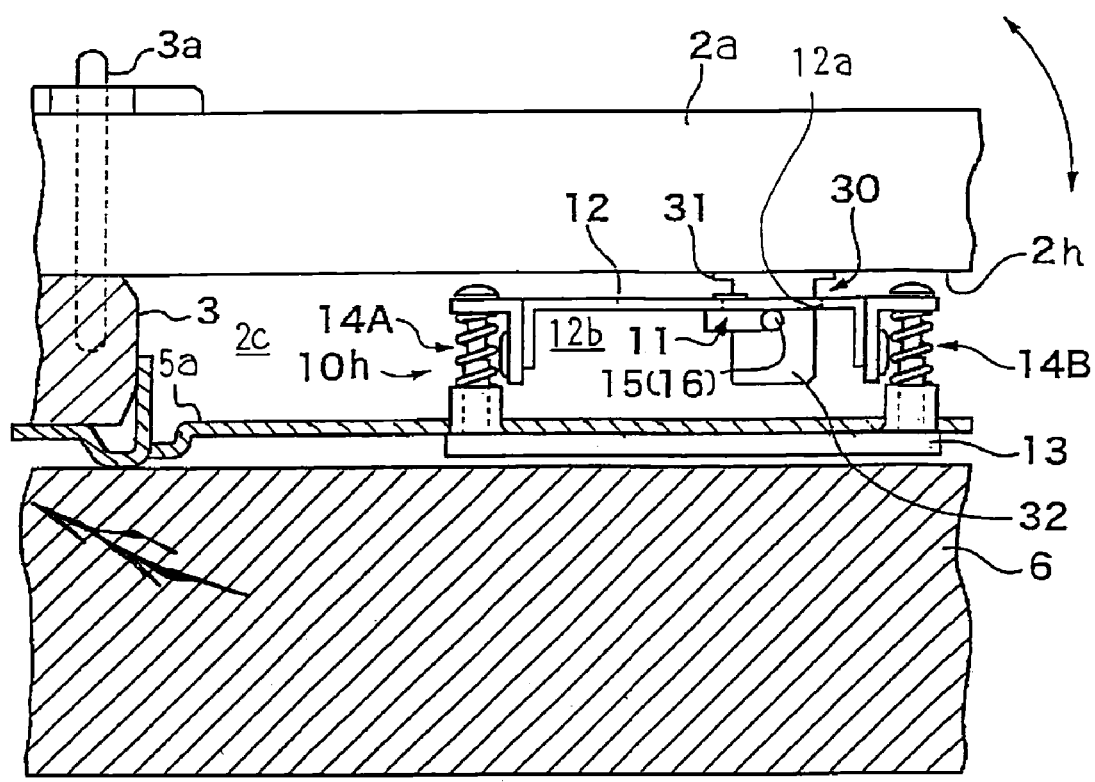
FIG. 2 is a partially cross sectional side view showing an optical sensor head unit incorporated in the mute piano.

Turning to FIG. 2 of the drawings, the optical sensor head unit 10h is illustrated in detail. The optical sensor head unit 10h includes a base plate 13, a framework 12, adjusters 14A and 14B and an array of sensor heads 11. The base plate 13 is secured to the key frame 5a, and the adjusters 14A and 14B are upright on the base plate 13. The framework 12 laterally extends over the base plate 13 between the adjusters 14A and 14B, and is supported by the base plate 13 through the adjusters 14A and 14B. A worker adjusts the framework 12 at a proper height by means of the adjusters 14A and 14B.

Slits 12a are formed in the framework 12, and each of the slits 12a is laterally spaced from the adjacent slits 12a by a distance equal to the distance between the centerlines on the lower surfaces 2h of white and black keys 2a/2b. The optical modulators 30 have the centerlines aligned with the centerlines of the lower surfaces 2h of white and black keys 2a/2b. For this reason, the optical modulators 30 are respectively aligned with the slits 12a, and project through the slits 12a into space 12b below the framework 12.

The sensor heads 11 are provided below the framework 12, and are bolted to the framework 12 at intervals. The sensor heads 11 are arranged in such a manner as to be alternated with the slits 12a. Each of the sensor heads 11 has two light ports 15 or 16. One of the light ports 15 is directed to the light port of the adjacent sensor head 11 on the left side, and the other of the light ports 16 is directed to the light port of the adjacent sensor head 11 on the right side. Every other sensor head 11 is optically connected to selected one of the light emitters 10c, and the remaining sensor heads 11 are optically connected to the light detectors 10d. The sensor heads 11, which are connected to the light emitters 10c, radiate the light beams across the slits 12a toward the sensor heads 11, which are connected to the light detectors 10d. The light beams pass through the optical modulators 30, and are incident on the light ports of the adjacent sensor heads 11 connected to the light detectors 10d.

The light emitters 10c are sequentially energized in such a manner that each of the sensor heads 11 which is connected to one of the light detectors 10d, does not concurrently receive two light beams radiated from the adjacent sensor heads 11. The incident light is propagated to the light detectors 10d, and is converted to photocurrent in the light detectors 10d. The photocurrent flows into a suitable current-to-voltage converter (not shown) such as, for example, resistors, and the electric signals, which are representative of the current key positions, are supplied to the information processing system 60.

The optical modulator 30 has a unitary structure, and is made of transparent synthetic resin such as, for example, polycarbonate. The transparent synthetic resin is resiliently deformable. In this instance, the optical modulator 30 is prepared through an injection molding, and does not contain any coloring agent. A single sort of synthetic resin, i.e., polycarbonate is used in the injection molding.

Figure 3:
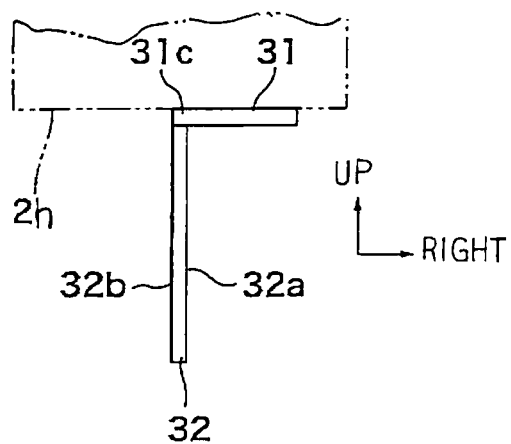
FIG. 3A is a front view showing an optical modulator attached to a white key of the mute piano.
FIG. 3B is a side view showing the optical modulator.
FIG. 3C is a plane view showing a base portion of the optical modulator.
Figure 3:
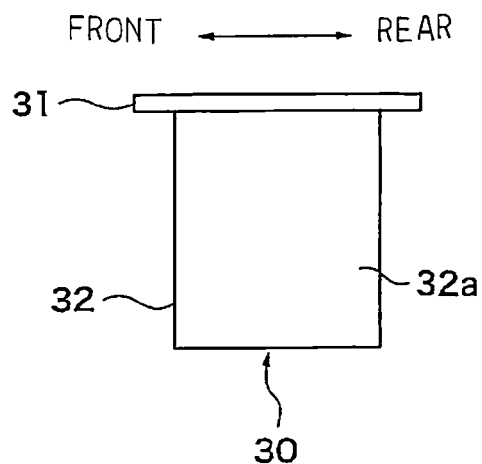
Figure 3:
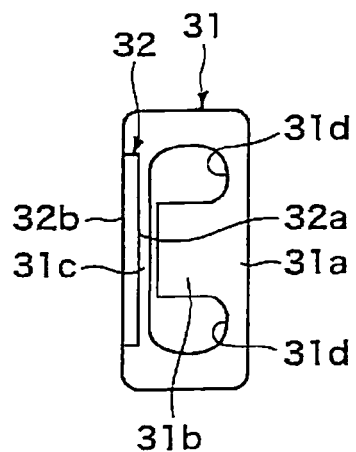

The optical modulator 30 has a base portion 31 and an optical modulating portion 32. As will be better seen in FIGS. 3A, 3B and 3C, the base portion 31 projects from the optical modulating portion 32 in rightward, and is formed with two holes 31d. In this instance, the holes 31d are generally elliptical. The two holes 31d are spaced from each other in the longitudinal direction, and a tie plate portion 31b is left between the two holes 31d. The tie plate portion 31b is merged with the right peripheral portion 31b, and is spaced from the left peripheral portion 31c.

The optical modulator 30 is secured to the associated white key 2a or black key 2b by means of a staple (not shown). In the assembling work, the optical modulator 30 is put on the surface 2h, and the optical modulating portion 32 is aligned with the centerline of the white key 2a or black key 2b. The tips of staple are stuck into the portions of key 2a/2b exposed to the two holes 31d, and the staple is driven into the key 2a/2b. The staple thus driven into the key 2a/2b presses the tie plate portion 31b to the surface 2h so that the optical modulator 30 is secured to the white key 2a or black key 2b. When the optical modulator 30 is secured to the white key 2a or black key 2b, the optical modulating portion 32 extends in the up-and-down direction, and the light beam is incident on the optical modulating portion 32 at right angle.

The optical modulating portion 32 has a flat surface 32a and a rough surface 32b. The rough surface 32b serves as a refractor. In this instance, the rough surface 32b or refractor causes the amount of transmitted light per unit area to be varied in the up-and-down direction through the refraction.

Figure 4:
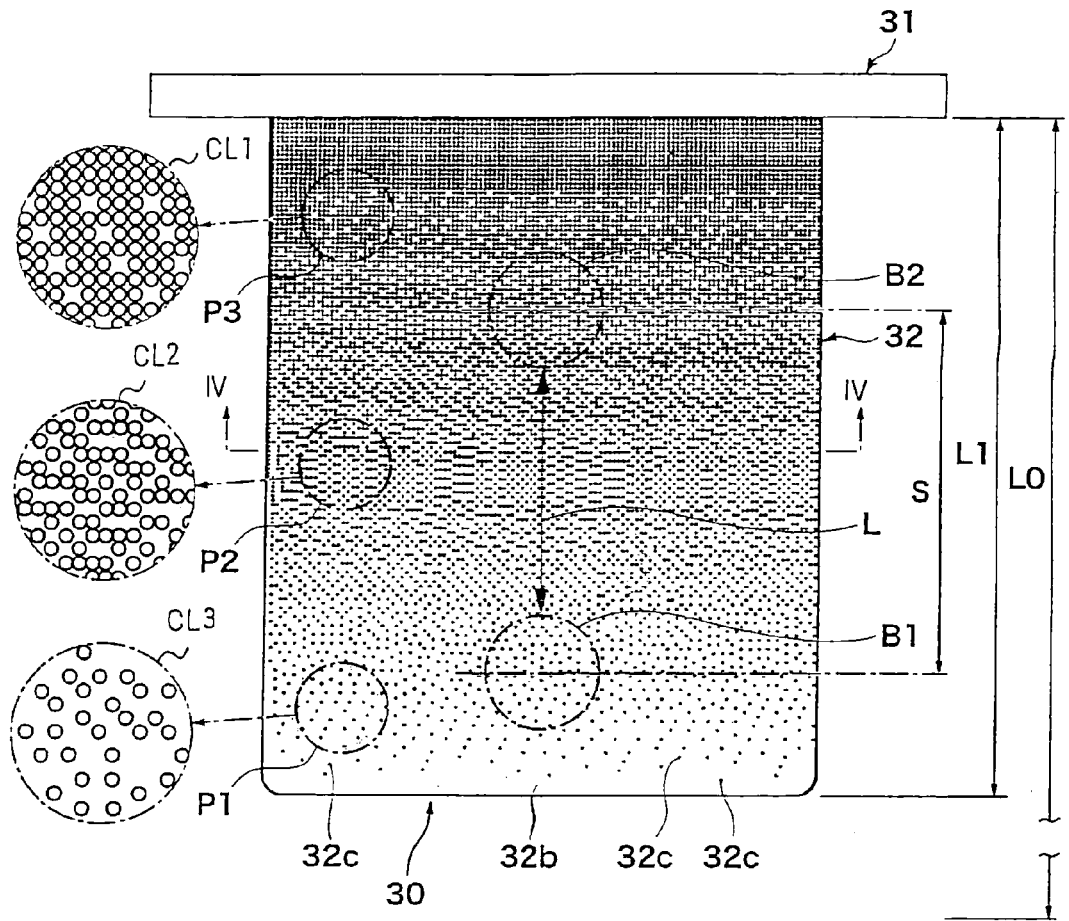
FIG. 4A is a side view partially enlarged and showing a surface of the optical modulator.
FIG. 4B is a cross sectional view taken along line IV-IV in FIG. 4A, and showing miniature refractors formed on a surface of the optical modulator.
Figure 4:
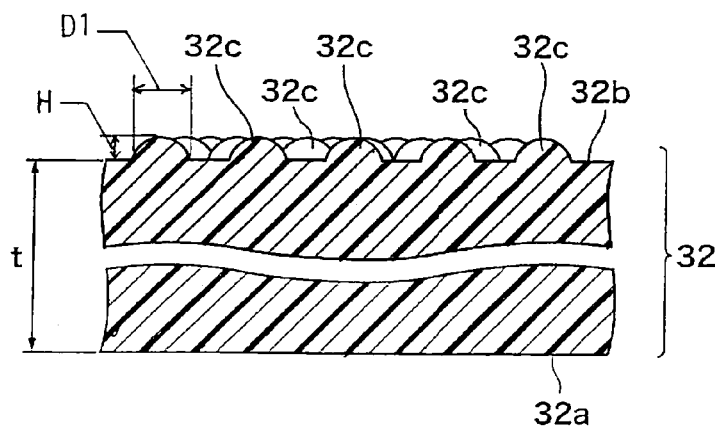

As will be better seen in FIGS. 4A and 4B, a large number of miniature refractors 32c form the rough surface 32b. The miniature refractors 32c and remaining portion of the optical modulating portion 32 are unitary. While the white key 2a or black key 2b is staying at the rest position, the light beam is fallen onto the optical modulating portion 32, and a light spot B1 takes place. When the white key 2a or black key 2b reaches the end position, the light spot B2 is found on the light modulating portion 32. Thus, the light beam is moved from the light spot B1 to the light spot B2 along a trajectory L during the travel of the white key 2a or black key 2b on the key trajectory. The distance S between the light spot B1 and the light spot B2 is equal to the stroke of white key 2a or the stroke of black key 2b. The area of light spot B1/B2 is equal to the unit area so that the amount of refracted light of the light beam is varied along the trajectory L.

The miniature refractors 32c have a semi-spherical configuration. The term "semi-spherical" means that the miniature refractors have circular bottom area. The miniature refractors 32c are 0.03 millimeter in height H, and are 0.07 millimeter in diameter D1. In this instance, the ratio between the height and the diameter, i.e., D1/H is of the order of 2.33. Although another optical modulator of the present invention may be formed with miniature refractors different in height and diameter from the miniature refractors 32c, it is desirable to make the ratio between the height H and diameter D1 fallen into a range of 2.33±20%. In order to prevent the optical modulator 30 from the shrinkage cavity inherent in the injection molding, it is desirable to make the height H of miniature refractors fallen within a range $(0.05 \times D1) \leq H \leq (0.5 \times D1)$.

The density of the miniature refractors 32c is varied from an upper area of the rough surface 32 to a lower area of the rough surface 32. The miniature refractors 32c are concentrated in the upper area as shown in circle CL1 at a large magnification ratio, and become sparse in the lower area as shown in circle CL3 at the large magnification ratio. The density of miniature refractors 32c is linearly decreased from the upper area toward the lower area along the trajectory L so that the miniature refractors 32c are less crowded in an intermediate area as shown in circle CL2 at the large magnification ratio.

In this instance, the density of miniature refractors 32c is made varied through an error variance method, which was employed in the prior art process disclosed in the above-mentioned Japanese Patent Application laid-open 2001-228862.

As to the number of miniature refractors 32c per unit area, which is as wide as the light spot B1/B2, the optical modulating portion has a minimum of 25 miniature refractors 32c. In other words, there are 25 miniature refractors 32c in the light spot B1.

The maximum diameter Dmax of light spot B1/B2 is determined as follows. The length L1, which is the distance between the upper end of the optical modulating portion 32 and the lower end of the optical modulating portion 32, is expressed as $$L1 \leq L0 - S \qquad \text{Equation 1}$$

where L0 is the distance between the upper end of the optical modulating portion at the rest position and the lower end of the optical modulating portion at the end position.

The maximum diameter Dmax of the light spot B1/B2 is to satisfy equation 2.

$$D\max \leq L1 - S \qquad \text{Equation 2}$$

From equations 1 and 2, the maximum diameter Dmax is given as $$D\max = L0 - 2S \qquad \text{Equation 3}$$

Description is hereinafter made on how the light beam is modulated by means of the miniature refractors 32c. FIG. 5A shows the light passing through the miniature refractor 32c, and FIG. 5B shows the optical beam across the optical modulator 32 between the light ports 15 and 16 of adjacent sensor heads 11. The sensor head 11 radiates the light beam from the light port 15 toward the light port 16 of the other sensor head 11. Though not shown in FIG. 5B, the light port 15 has a convex lens, and the convex lens makes the emitted light parallel rays 20. The light port 16 has a condenser lens 16a, and the light is incident on the optical fiber 10e. The optical fiber 10e guides the incident light to the light detector 10d.

The light beam is fallen on the flat surface 32a at right angle, and forms the light spot B. The transparent optical modulating portion 32 allows the light in the light spot B to pass therethrough. As described hereinbefore, the miniature refractors 32c are formed on the rough surface 32b. However, the miniature refractors 32c are spaced from one another. In other words, the miniature refractors 32c are surrounded by a flat surface 32ba. The flat surface 32ba is in parallel to the flat surface 32a. In this situation, the parallel rays 20 are refracted through the miniature refractors 32c as indicated by arrows 20a. The angle of refraction is dependent on the radius of curvature of the surface of miniature refractors 32c. However, the parallel rays 20 are output from the flat surface 32ba substantially without any refraction as indicated by arrows 20b.

The condenser lens 16a is designed to make the rays 20b incident on the end surface of the optical fiber 10e. However, there is not any guarantee for the refracted rays 20a to be fallen on the end surface of the optical fiber 10e. For this reason, most of the refracted rays 20a do not reach the light detector 10d.

As described hereinbefore, the density of miniature refractors 32c is varied along the trajectory L so that the amount of light incident on the end surface of optical fiber 10e is also varied along the trajectory L. Thus, the current key position is converted to the amount of incident light and, accordingly, the amount of photocurrent by virtue of the optical modulator 30 of the present invention.

The optical modulator 30 is produced as follows. First, a molding die unit (not shown) is prepared for an injection molding. A cavity, which has contours corresponding to those of the optical modulator 30, is formed in the molding die unit, and semi-spherical miniature recesses are open to the inner surface of the molding die unit.

Molten synthetic resin is injected into the cavity of the molding die unit. The molten synthetic resin is solidified in the molding die unit. After the solidification, the optical modulator 30, which is formed with a large number of miniature refractors 32c, is taken out from the molding die unit. Thus, the optical modulator 30 is produced only through the injection molding. Other production steps such as, for example, the printing work, adhesion to the transparent plate and lithography are not required for the optical modulator 30. For this reason, the optical modulator 30 is economically produced. The reduction in production cost of optical modulators 30 make the manufacturer to offer the mute piano at a low price.

The optical modulating portion 32 and base portion 31 have the unitary structure. The unitary structure is desirable for the simple assembling work. The worker is expected to drive the staple into the white key 2a or black key 2b through the holes 31d. The optical modulators 30 are attached to all of the keys 2a/2b, respectively, and the acoustic piano 1 typically has eighty-eight keys 2a/2b. The worker repeats the assembling work on the optical modulator eighty-eight times. The optical modulator 30 makes the time and labor in the assembling work surely reduced.

The miniature refractors 32c are conducive to high resolution of the current key position. The large number of miniature refractors 32c makes the amount of light gently varied along the key trajectory. Even though the white key 2a or black key 2b is moved over an extremely short distance, the amount of light is varied so that the extremely short distance is converted to the electric signal.

Information Processing System

Turning back to FIG. 1, the information processing system 60 includes an information processor 61 and a tone generator 62. The information processor 61 has a data processing capability and a large data holding capability, and a computer program runs on the information processor 61. Various takes are achieved through the execution of instruction codes of the computer program.

The computer program is broken down into a main routine program and subroutine programs. While the main routine program is running on the information processor 61, users are communicable with the information processing system 60. For example, a user gives his or her instructions to the information processor 61, and acquires pieces of knowledge about the current status of the information processing system 60.

The information processor 61 periodically fetches pieces of positional data expressing the current key positions and current hammer positions from a data interface through execution of instruction codes in one of the subroutine programs, and the pieces of positional data are stored in a suitable memory in the information processor 61.

When a user instructs the information processing system 60 to change the silent system 80, the main routine program braches to another subroutine program, and the information processor 61 supplies a driving signal for changing the silent system 80.

While a user is fingering on the keyboard 2, the main routine program periodically branches to yet another subroutine program, and produces music data codes through analysis on the pieces of positional data.

The tone generator 62 has a waveform memory, and pieces of waveform data, which express the waveforms of tones, are stored in the waveform memory. When the music data code expressing a note-on event is supplied from the information processor 61 to the tone generator 62, a series of pieces of waveform data is read out from the waveform memory, and an audio signal is produced from the pieces of waveform data. When the music data code expressing a note-off event reaches to the tone generator 62, the tone generator 62 makes the audio signal decayed.

As described hereinbefore, the optical transducer system 10h of the present invention accurately converts the current key positions and current hammer positions to the electric signals. The information processor 61 accurately determines the key velocity, timing at which the electronic tone is to be produced and timing at which the electronic tone is to be decayed. Thus, the optical transducer system 10h of the present invention is conducive to the electronic tones at high fidelity.

Sound System

The sound system 70 includes amplifiers 71 and a headphone 72. Small-sized loud speakers may be further incorporated in the sound system 70. The audio signal is equalized and amplified in the amplifiers 71, and is converted to the electronic tones through the headphone 72 after the amplification.

Mute System

The mute system 80 includes a hammer stopper 81 and an electric motor unit 82. The hammer stopper 81 extends in the space between the hammers 7 and the strings 8 in the lateral direction, and is changed between a free position and a blocking position by means of the electric motor unit 82.

While the hammer stopper 81 is staying at the free position, the hammers 7 are brought into collision with the strings 8 without any interference of the hammer stopper 81. For this reason, the acoustic piano tones are produced through the vibrations of the strings 8.

When the driving signal is supplied from the information processor 61 to the electric motor unit 82, the electric motor unit 82 changes the hammer stopper 81 from the free position to the blocking position, and the hammer stopper 81 is moved into the trajectories of hammers 7. Although the hammers 7 escape from the action units 4, the hammers 7 rebound on the hammer stopper 81 before reaching the strings 8 so that any acoustic piano tone is not produced. A player hears the electronic tones instead of the acoustic piano tones. Thus, the silent system 80 makes it possible to practice the fingering on the keyboard 2 without disturbance to the neighborhood.

As will be understood from the foregoing description, the optical modulator 30 of the present invention has the miniature refractors, the density of which is varied in the direction in which the light spot B1/B2 is moved. The miniature refractors vary the amount of refracted light and, accordingly, the amount of light incident on the optical fiber 10e depending upon the current position of the associated white key 2a or black key 2b. As a result, the current key position is exactly converted to the electric signal.

The optical modulator 30 has the unitary structure, and is, by way of example, produced through the molding. Thus, the optical transducer is appropriate to the mass-production. The manufacturer can reduce the production cost of optical transducer 10h and, accordingly, the mute piano.

Second Embodiment

Figure 6:
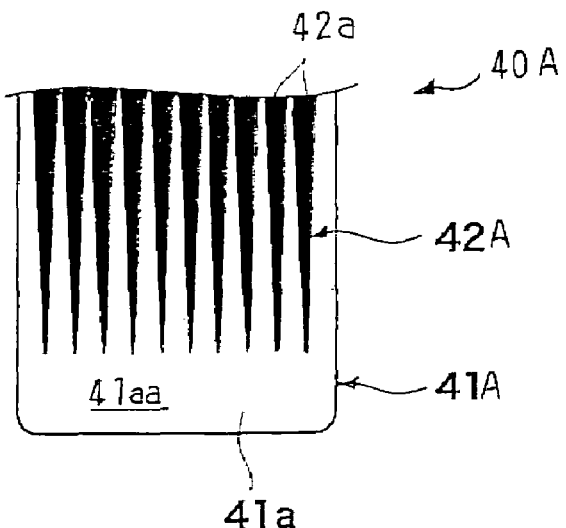
FIG. 6 is a side view showing wedge-shaped refractors formed in another optical modulator according to the present invention.

Turning to FIG. 6, another hybrid keyboard musical instrument embodying the present invention also comprises an acoustic piano, an information processing system, a sound system, a mute system and an optical transducer system 40A. Since the acoustic piano, information processing system, sound system and mute system are similar to the acoustic piano 1, information processing system 60, sound system 70 and mute system 80, no further description is hereinafter incorporated for avoiding repetition. When component parts of the acoustic piano, information processing system, sound system and mute system are referred to in the following description, the component parts are labeled with the references designating the corresponding component parts of the acoustic piano 1, information processing system 60, sound system 70 and mute system 80.

The optical transducer system 40A includes light emitters, light detectors, optical fibers, sensor heads and optical modulators 41A, one of which is illustrated in FIG. 6. Although the optical modulators 41A have respective fixtures, the fixtures are not shown in FIG. 6, and only optical modulating portions of the optical modulators 41A are illustrated. For this reason, the optical modulating portions are hereinafter labeled with the references 41A. Since only the optical modulating portion 41A is different from that of the optical modulator 30, description is hereinafter focused on the optical modulating portion 41A.

Figure 7:
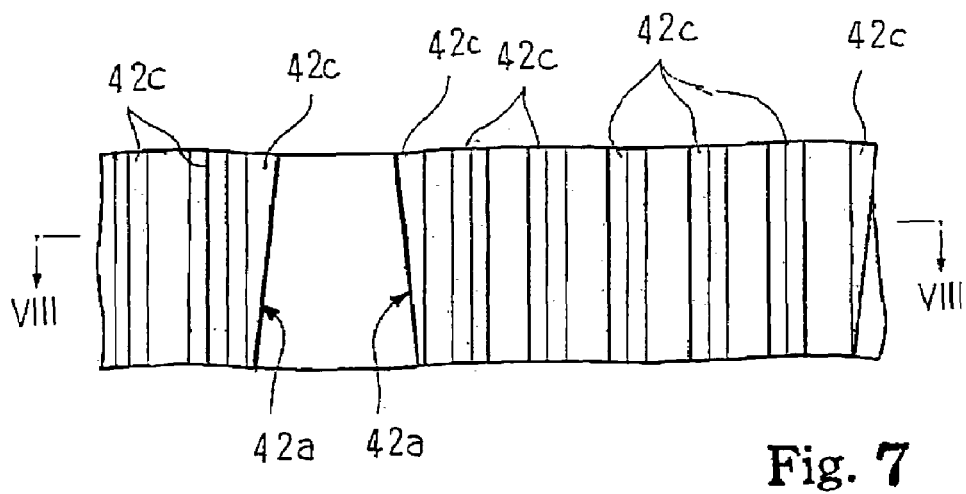
FIG. 7 is a side view showing a part of the wedge-shaped refractors at large magnification ratio.
Figure 8:
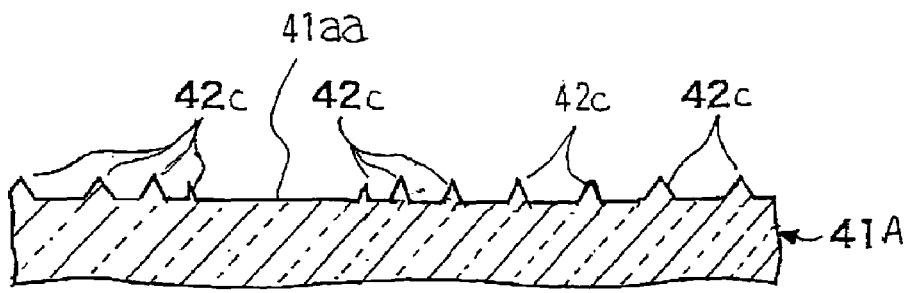
FIG. 8 is a cross sectional view taken along line VIII-VIII in FIG. 7 and showing ridges forming the wedge-shaped refractors.

The optical modulating portion 41A is formed with wedge-shaped refractors 42a instead of the miniature refractors 32c. The wedge-shaped refractors 42a are respectively implemented by groups of ridges 42c extending in the up-and-down direction as shown in FIG. 7. The ridges 42c extend at regular intervals. Since the length of ridges in each group is decreased from the centerline of the wedge-shaped refractor 42a toward both sides of the wedge-shaped refractor 42a, the group of ridges 42c is seen as the wedge-shaped refractor 42a. The ridge 42c has a triangle cross section as shown in FIG. 8, and makes light refracted. The wedge-shaped refractors 42a are arranged in parallel to one another, and form a wedge pattern 42A.

Although the wedge-shaped refractors 42a are colored in black in FIG. 6, the wedge-shaped ridges 42a, i.e., the groups of ridges 42c are colorless, and are transparent. The coloration is made for the sake of better understanding of the wedge-shaped refractors 42a.

The wedge pattern 42A is formed in the optical modulating portion 41a. The base portion is similar to the base portion 31, and, for this reason, is not hereinafter detailed. The base portion and optical modulating portion 41a, which includes the wedge-shaped refractors 42a, have a unitary structure, and is formed through an injection molding.

The optical modulating portion 41a has a flat surface and a rough surface 41aa. The ridges 42c make the surface 41aa rough, and the rough surface 41aa is reverse to the flat surface. The light beam is incident on the flat surface, and forms a light spot as similar to the first embodiment. The incident light passes through the optical modulating portion 41a, and is output from the rough surface 41aa.

When the light is output from the rough surface 41aa, the light is partially refracted by means of the wedge-shaped refractors 42a. Since the width of each wedge-shaped refractors 42a is reduced toward the lower end of the optical modulating portion 41A, the amount of light refracted is varied along the trajectory of the optical modulating portion 41A. Although the non-refracted light, which is output from between the ridges 42c, is incident onto the end surface of the optical fiber connected to the light detector, there is not any guarantee for the refracted light to be incident on the end surface of the optical fiber. Thus, the amount of light incident on the optical fiber is varied in dependent on the current key position of the associated key 2a/2b. In other words, the optical modulating portion 41A converts the current key position to the light incident on the optical fiber connected to the light detector.

As will be understood from the foregoing description, the wedge-shaped refractors 42a are formed in the optical modulator 41A, and the wedge-shaped refractors 42a vary the amount of light incident on the optical fiber 10e depending upon the current key position through the refraction. Thus, the optical transducer system 40A exactly converts the current key position to the electric signal.

The wedge-shaped refractors 42a and the remaining portion of optical refractor 41A have the unitary structure so that the optical modulator 41A is easy to produce. For this reason, the production cost of optical modulator 41A is low so that the optical modulators 41A make the production cost of optical transducer system 40A and, accordingly, the hybrid musical instrument low.

Third Embodiment

Yet another hybrid keyboard musical instrument embodying the present invention also comprises an acoustic piano, an information processing system, a sound system, a mute system and an optical transducer system 40B. Since the acoustic piano, information processing system, sound system and mute system are similar to the acoustic piano 1, information processing system 60, sound system 70 and mute system 80, no further description is hereinafter incorporated for the sake of simplicity. When component parts of the acoustic piano, information processing system, sound system and mute system are referred to in the following description, the component parts are labeled with the references designating the corresponding component parts of the acoustic piano 1, information processing system 60, sound system 70 and mute system 80.

Figure 9:
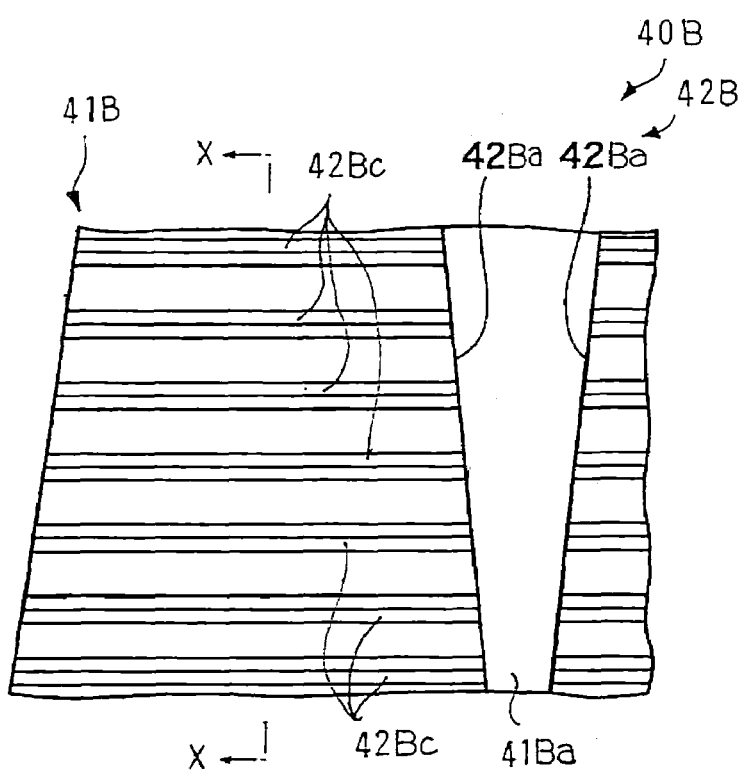
FIG. 9 is a side view showing a part of another wedge-shaped refractor formed in yet another optical modulator according to the present invention.

The optical transducer system 40B includes light emitters, light detectors, optical fibers, sensor heads and optical modulators 41B, one of which is illustrated in FIG. 9. Although the optical modulators 41B respectively have fixtures, the fixtures are omitted from the optical modulators 41B in FIGS. 9 and 10, and only optical modulating portions are shown. For this reason, the optical modulating portions are hereinafter labeled with references "41B". Since only the optical modulating portion 41B is different from that of the optical modulator 30, description is focused on the optical modulating portion 41B.

The optical modulating portion 41B is formed with a wedge pattern 42B. The wedge pattern 42B makes a light output surface 41Ba rough. Plural wedge-shaped refractors 42Ba form the wedge pattern 42B, and extend in the up-and-down direction. However, the wedge-shaped refractors 42Ba are directed oppositely to the wedge-shaped refractors 42a. Although the wedge-shaped refractors 42a are sharpened toward the downward direction, the wedge-shaped refractors 42Ba are upwardly sharpened.

Figure 10:
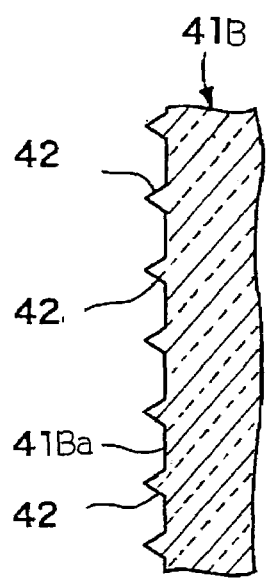
FIG. 10 is a cross sectional view taken along line X-X in FIG. 9 and showing ridges forming the wedge-shaped refractor.

The wedge-shaped refractors 42Ba are respectively implemented by groups of ridges 42Bc extending in the fore-and-aft direction. The ridges 42Bc in each group are arranged in regular pitches. Since the length of ridges in each group is decreased from the lower end of the wedge-shaped refractor 42Ba toward the upper end of the wedge-shaped refractor 42Ba, the group of ridges 42Bc is seen as the wedge-shaped refractor 42Ba. The ridge 42c has a triangle cross section as shown in FIG. 10, and makes light refracted. The wedge-shaped refractors 42Ba are arranged in parallel to one another.

The wedge pattern 42B is formed in the optical modulating portion 41B. The base portion is similar to the base portion 31, and, for this reason, is not hereinafter detailed. The base portion and optical modulating portion, which includes the wedge-shaped refractors 42Ba, have a unitary structure, and is formed through an injection molding.

The optical modulating portion has a flat surface and the rough surface 41Ba. The ridges 42Bc make the surface 41Ba rough, and the rough surface 41Ba is reverse to the flat surface. The light beam is incident on the flat surface, and forms a light spot as similar to the first embodiment. The incident light passes through the optical modulating portion, and is output from the rough surface 41Ba. When the light is output from the rough surface 41Ba, the light is partially refracted by means of the wedge-shaped refractors 42Ba. Since the width of each wedge-shaped refractors 42Ba is reduced toward the upper end of the optical modulating portion, the amount of light refracted is varied along the trajectory of the optical modulating portion 41B. Although the non-refracted light, which is output from between the ridges 42Bc, is incident onto the end surface of the optical fiber connected to the light detector, there is not any guarantee for the refracted light to be incident on the end surface of the optical fiber. Thus, the amount of light incident on the optical fiber is varied in dependent on the current key position of the associated key 2a/2b. In other words, the optical modulating portion 41B converts the current key position to the light incident on the optical fiber connected to the light detector.

As will be understood from the foregoing description, the wedge-shaped refractors 42Ba are formed in the optical modulator 41B, and the wedge-shaped refractors 42Ba vary the amount of light incident on the optical fiber 10e depending upon the current key position through the refraction. Thus, the optical transducer system 40B exactly converts the current key position to the electric signal.

The wedge-shaped refractors 42Ba and the remaining portion of the modulator 41Ba have the unitary structure so that the optical modulator 40B is easy to produce. For this reason, the production cost of optical modulator 41B is low so that the optical modulator 41B makes the production cost of optical transducer system 40B and, accordingly, the hybrid musical instrument low.

Fourth Embodiment

FIGS. 11, 12 and 13 show still another optical modulator 40C embodying the present invention. The optical modulator 40C forms a part of an optical transducer system, which is incorporated in a musical instrument. The optical modulator 40C has a fixture 50 and an optical modulating portion 52. The fixture 50 and modulating portion 52 have a unitary structure, and an injection molding is available for the optical modulator 40C.

The miniature refractors 32c or wedge-shaped refractors 42a/42Ba are formed on a light output surface of the optical modulating portion 52 so that the light beam is modulated with the optical modulating portion 52. Thus, the optical modulating portion 52 is similar to the optical modulating portions of the optical modulators 30, 40A and 40B.

However, the fixture 50 is different from the base portions of the optical modulators 30, 40A and 40B. For this reason, description is hereinafter focused on the fixture 50.

The fixture 50 makes it possible to attach the optical modulator 40C to a white key 2a or black key 2c through a single action. Any staple is not required for the assemblage. Two recesses (not shown), which are open onto the lower surface of the key 2a/2b, are to be formed in the white key 2a or black key 2b. The fixture 50 has an anti-rotation column 53 and a pair of hooks 54. The pair of hooks 54 is resiliently deformable, and the hooks 54 have wedges at the tips thereof. The pair of hooks 54 is inserted into one of the recesses (not shown) formed in the key 2a/2b, and prevents the optical modulator 40C from dropping off from the key 2a/2b by virtue of the increased friction between the inner surface and the wedges. The anti-rotation column 53 is inserted into the other of the recesses (not shown), and prevents the optical modulator from rotation about the pair of hooks 54. Thus, the fixture 50 makes the assembling work easy and speedy.

As will be appreciated from the foregoing description, the optical modulators 30, 40A, 40B and 40C have their own unitary structures, and the unitary structures make the processes for producing the optical modulators 30, 40A, 40B and 40C simple. For this reason, the production cost of optical modulators 30, 40A, 40B and 40C is lower than the production cost of the prior art optical modulators. Since a large number of optical modulators 30, 40A, 40B or 40C are required for the musical instrument, the employment of optical transducers of the present invention permits the manufacturer of optical transducer system 10h and manufacturer of musical instruments to reduce the production cost of the optical transducer system and production cost of musical instruments.

Although particular embodiments of the present invention have been shown and described, it will be apparent to those skilled in the art that various changes and modifications may be made without departing from the spirit and scope of the present invention.

The mute piano does not set any limit to the technical scope of the present invention. The optical transducer system of the present invention may be incorporated in another sort of hybrid musical instrument such as, for example, an automatic player piano.

The hybrid musical instrument does not set any limit to the technical scope of the present invention. The optical transducer system may be incorporated in an electronic musical instrument such as, for example, an electronic keyboard.

The keyboard musical instrument does not set any limit to the technical scope of the present invention. Another sort of musical instrument such as, for example, a hybrid percussion instrument, a hybrid wind musical instrument or a hybrid stringed musical instrument may be equipped with the optical transducer system of the present invention. The vibrations of head, movements of sticks, movements of pistons/keys vibrations of strings or movements of bows may be converted to electric signals by means of the optical transducer system of the present invention.

The key position transducer sub-system 10a and hammer position transducer sub-system 10b do not set any limit to the technical scope of the present invention. In case where an optical transducer system of the present invention is employed in an automatic player piano, the optical transducer system may further include a pedal position transducer sub-system and a plunger velocity transducer sub-system. Moreover, an optical transducer system of the present invention may be incorporated in a hybrid wind musical instrument. In case of the hybrid wind musical instrument, a slide, a piston, a rotary valve or a key mechanism is monitored by the optical transducer system of the present invention.

The optical transducer system of the present invention may be used in conversion from another sort of physical quantity such as, for example, velocity or acceleration to a piece of data information expressing the velocity or acceleration.

The semi-spherical configuration does not set any limit to the technical scope of the present invention. Miniature refractors may have a bottom area expressed as a surface of $n^{th}$ order in so far as the ratio D1/H is fallen within the above-described ratio where n is an even number. An example is a paraboloid. The miniature refractors may be a cone or a pyramid.

The miniature refractors may be different in size.

As described in conjunction with the second and third embodiments, the ridges 42c/42Bc are arranged at the regular pitches so that the error variance method does not set any limit to the rough surface.

Miniature caves may be formed in a transparent plate as the miniature refractors. The rough surface of an optical modulator of the present invention may be formed by both of the miniature projections and miniature caves.

The optical fibers 10e and sensor heads 11 may be deleted from an optical transducer system of the present invention. In this instance, the light emitters 10c are directly opposed to the light detectors 10d through the optical modulator 32. Otherwise, the convex lenses may be directly adhered to the ends of the optical fibers 10e, and the convex lenses of each pair are opposed to each other.

The triangle cross section of ridges 42c and 42Bc does not set any limit to the technical scope of the present invention. The cross section may be polygonal or the semi-spherical, which satisfies the above-described ratio D1/H. A group of semi-columns, which has a semi-circular cross section, may form each of the wedge-shaped refractors.

The wedge shape patterns 42A and 42B do not set any limit to the technical scope of the present invention. The envelope of the ridges 42c or 42Bc may be curved such as, for example, a parabolic line.

The miniature refractors 32c, wedge-shaped refractors 42a and 42Ba are formed on the light output surface. An optical modulator of the present invention may be formed with the refractors on a light incident surface of the optical modulator. Otherwise, the refractors may be formed on both surfaces of an optical modulator.

In the above-described embodiments, the optical modulators are connected to the white keys 2a and black keys 2b so as to be moved together with the white keys 2a and black keys 2b. However, this feature does not set any limit to the technical scope of the present invention. In case where a moving object has a great width, a light emitter and a light detector may be connected to the moving object. In this instance, the optical modulator is stationary. Thus, the optical modulator is to be relatively moved with respect to the light emitter and light detector. However, it is not necessary to make the optical modulator moved together with the moving object.

In the above-described embodiments, the miniature refractors 32c and wedge-shaped refractors 42a or 42Ba have a constant refractive index. In order to vary the amount of light incident on the sensor heads 16, the refractive index may be varied along the direction in which the white keys 2a or black keys 2b are moved.

The component parts of musical instruments implementing the first, second, third and fourth embodiments are correlated with claim languages as follows.

Each of the white keys 2a and black keys 2b or each of the hammers 7 serves as a "moving object". The current position is equivalent to a "physical quantity". The light emitter 10c, optical fiber 10e, sensor head 15 as a whole constitute a "light emitting unit", and the sensor head 16, optical fiber 10e and light detector 10d form in combination a "light detecting unit". The light incident on the sensor head 16 is corresponding to "modulated light". The miniature refractors 32c, wedge-shaped refractors 42a or wedge-shaped refractors 42Ba form in combination a "refracting portion". The optical modulators except for the optical modulating portions 32, 41A, 41B and 52 serve as a "non-refracting portion".

The white keys 2a and black keys 2b, action units 4, hammers 7 and dampers 8a as a whole constitute "plural force transmitting paths", and the strings 8 serve as "plural tone generators". The pitch of tones is an "attribute" of tones. The loudness of tones is another "attribute" of tones.

What is claimed is:

1. An optical modulator relatively moved with respect to a light emitting unit radiating a light beam across a trajectory and a light detecting unit receiving modulated light, said optical modulator being connected to a moving object so as to be moved along said trajectory together with said moving object, said optical modulator comprising:

a non-refracting portion transparent to said light beam, and producing a part of said modulated light, a refraction angle of said part of said modulated light being approximately equal to an incident angle of said light beam; and a refracting portion varying the amount of another part of said modulated light, said refraction angle of said another part of said modulated light being different from said incident angle of said light beam through refraction of said light beam, depending upon a physical quantity of said moving object on said trajectory.

2. The optical modulator as set forth in claim 1, in which said non-refracting portion and said refracting portion have a unitary structure.

3. The optical modulator as set forth in claim 2, in which said unitary structure is made of a single sort of transparent synthetic resin.

4. The optical modulator as set forth in claim 1, in which said refracting portion has refractors formed in said non-refracting portion in such a manner as to make an area occupied by said refractors per unit area varied in a direction in which said trajectory of said moving object extends.

5. The optical modulator as set forth in claim 4, in which the number of said refractors per said unit area is varied so as to make said area occupied by said retractors varied in said direction.

6. The optical modulator as set forth in claim 4, in which said retractors have a wedge shaped, and the wedge-shaped refractors are arranged in parallel in said non-refracting portion.

7. The optical modulator as set forth in claim 1, further comprising a fixture formed in a unitary structure together with said refracting portion and said non-refracting portion so that said optical modulator is connected to said moving object by means of said fixture.

* * * * *